United States Patent [19]

Tsuji et al.

[11] Patent Number: 5,624,993
[45] Date of Patent: Apr. 29, 1997

[54] CHLOROPRENE POLYMER COMPOSITION AND PROCESS FOR ITS PRODUCTION

[75] Inventors: Tsuyoshi Tsuji; Hiroaki Oba; Kousuke Watanabe; Masao Koga, all of Niigata, Japan

[73] Assignee: Denki Kagaku Kogyo Kabushiki Kaisha, Tokyo, Japan

[21] Appl. No.: 657,329

[22] Filed: Jun. 3, 1996

Related U.S. Application Data

[62] Division of Ser. No. 444,369, May 18, 1995, Pat. No. 5,567,771.

[30] Foreign Application Priority Data

May 20, 1994 [JP] Japan .................................. 6-106914
Jun. 14, 1994 [JP] Japan .................................. 6-131965
Nov. 8, 1994 [JP] Japan .................................. 6-273529

[51] Int. Cl.$^6$ .............. C08L 11/02; C08L 27/04; C08L 11/00

[52] U.S. Cl. .............. 524/501; 524/519; 525/215; 525/221; 525/222; 525/227; 525/232; 525/238; 525/241

[58] Field of Search .................... 525/215, 227; 524/501, 519

[56] References Cited

U.S. PATENT DOCUMENTS 5,140,072  8/1992  Takeshita .................................. 575/215

*Primary Examiner*—Fred Zitomer
*Attorney, Agent, or Firm*—Oblon, Spivak, McClelland, Maier & Neustadt, P.C.

[57] ABSTRACT

A chloroprene polymer composition containing an $\alpha,\beta$-unsaturated carboxylate polymer having a number average molecular weight of at least 300,000.

5 Claims, No Drawings

CHLOROPRENE POLYMER COMPOSITION AND PROCESS FOR ITS PRODUCTION

This is a division of application Ser. No. 08/444,369 filed on May 18, 1995, U.S. Pat. No. 5,567,771.

The present invention relates to a chloroprene polymer composition excellent in ozone resistance and a process for its production.

Chloroprene polymers have a good balance of physical properties such as common rubber physical properties, weather resistance, heat resistance and chemical resistance, and they are therefore used in a wide range of fields including fields of common industrial rubber products, automobile parts and adhesives. However, in recent years, the condition in which rubber products are used, tends to be increasingly severe, and it has become difficult to comply severe requirements with conventional chloroprene polymers. Various studies have been made to cope with such a problem. With respect to the ozone resistance as the main subject of the present invention, it has been common to incorporate an antiozonant to chloroprene polymers, and such a method is widely employed. However, the method of incorporating an antiozonant is likely to bring about problems such as scorching of unvulcanized material, blooming of the antiozonant and deterioration in the tensile properties of the vulcanizate. Accordingly, it has been difficult to properly select the type and the amount of the antiozonant, and the effect of improving the ozone resistance has been inadequate.

It is an object of the present invention to solve such drawbacks and to provide a chloroprene polymer composition having the ozone resistance substantially improves while suppressing deterioration in the tensile properties, and a process for its production.

Thus, the present invention provides a chloroprene polymer composition containing an $\alpha,\beta$-unsaturated carboxylate polymer having a number average molecular weight of at least 300,000.

Further, the present invention provides a process for producing a chloroprene polymer composition, which comprises mixing a chloroprene rubber latex and an $\alpha,\beta$-unsaturated carboxylate polymer emulsion.

Now, the present invention will be described in further detail with reference to the preferred embodiments.

The chloroprene polymer in the present invention is a homopolymer of 2-chloro-1,3-butadiene (hereinafter referred to as chloroprene) or a copolymer obtainable by polymerizing chloroprene and at least one monomer copolymerizable with chloroprene.

The monomer copolymerizable with chloroprene in the present invention includes, for example, 2,3-dichloro-1,3-butadiene, 1-chloro-1,3-butadiene, butadiene, isoprene, sulfur, styrene, acrylonitrile, acrylic acid and its esters, and methacrylic acid and its esters. Such monomers may be used in combination as a mixture of two or more of them, as the case requires.

In the present invention, polymerization of chloroprene alone or a monomer mixture comprising chloroprene and at least one monomer copolymerizable therewith, can be carried out by any conventional method. However, it is most common and simple to employ a method of carrying out radical polymerization in an aqueous emulsion.

The emulsifier to be used for the aqueous emulsion polymerization is not particularly limited, and any emulsifier may be employed so long as it is an emulsifier commonly used for emulsion polymerization of chloroprene. For example, an anionic emulsifier such as a rosinic acid, a fatty acid salt or an alkylbenzene sulfonate, or a nonionic emulsifier such as an alkylpolyethylene glycol or a polyvinyl alcohol, as well as a cationic emulsifier such as a quaternary ammonium salt, may be employed. However, preferred is an anionic emulsifier such as a rosinic acid or a fatty acid salt.

The temperature for polymerization in the present invention is not particularly limited, but is preferably within a range of from 0° to 55° C. If the temperature is lower than 0° C., freezing of water will be a problem, and if it is higher than 55° C., a pressure installation will be required in view of the vapor pressure of chloroprene.

The molecular weight of the chloroprene polymer can be adjusted by means of a chain transfer agent. The chain transfer agent is not particularly limited and may be any chain transfer agent which is commonly known. For example, an alkyl mercaptan such as dodecyl mercaptan, a xanthogen disulfide such as diethylxanthogen disulfide, or a halogenated hydrocarbon such as iodoform, may be employed.

As the polymerization initiator, an organic or inorganic peroxide which is commonly used for emulsion polymerization of chloroprene, may be employed. For example, benzoyl peroxide, potassium persulfate or ammonium persulfate may be mentioned. For the purpose of controlling the reaction or completely carrying out the polymerization, a redox type radical initiator may be used.

The $\alpha,\beta$-unsaturated carboxylate polymer in the present invention is a homopolymer of an $\alpha,\beta$-unsaturated carboxylate or a copolymer of two or more $\alpha,\beta$-unsaturated carboxylates.

Here, the $\alpha,\beta$-unsaturated carboxylate is an ester made of an $\alpha,\beta$-unsaturated carboxylic acid and an alcohol. The $\alpha,\beta$-unsaturated carboxylic acid may, for example, be acrylic acid, methacrylic acid, crotonic acid, maleic acid or fumaric acid. Among them, acrylic acid is preferred.

The alcohol may, for example, be an alkyl alcohol such as ethyl alcohol, butyl alcohol, dodecyl alcohol or octadecyl alcohol, an alkenyl alcohol such as allyl alcohol, a cyclic alcohol such as cyclopentyl alcohol or cyclohexyl alcohol, an aralkyl alcohol such as benzyl alcohol or phenetyl alcohol, methoxyethyl alcohol, glycidyl alcohol, or a dialkyl amino ethyl alcohol. Among them, n-butyl alcohol or ethyl alcohol is preferred. Particularly preferred is n-butyl alcohol.

As the polymerization method for the $\alpha,\beta$-unsaturated carboxylate polymer having a number average molecular weight of at least 300,000 of the present invention, any conventional method may be employed. However, it is common to employ a method of emulsion radical polymerization.

To the $\alpha,\beta$-unsaturated carboxylate polymer having a number average molecular weight of at least 300,000 of the present invention, a monomer other than the $\alpha,\beta$-unsaturated carboxylate, may be copolymerized to such an extent not to impair the effects of the present invention. The monomer other than the $\alpha,\beta$-unsaturated carboxylate may, for example, be acrylic acid, methacrylic acid, acrylonitrile, ethylene, propylene, styrene, vinyl acetate, vinyl chloride, isoprene, butadiene, chloroprene, 2,3-dichloro-1,3-butadiene, glycidyl methacrylate, allyl glycidyl ether, 2-chloroethyl vinyl ether or chloroacetic acid vinyl ester.

The emulsifier to be used for emulsion polymerization for the $\alpha,\beta$-unsaturated carboxylate polymer, is not particularly limited, and various types of emulsifiers may be employed as in the case of polymerization for the chloroprene polymer.

The molecular weight of the $\alpha,\beta$-unsaturated carboxylate polymer can be adjusted by means of a chain transfer agent.

The chain transfer agent is not particularly limited, and any chain transfer agent which is commonly known, for example, alkyl mercaptan such as dodecyl mercaptan, xanthogen disulfide such as diethylxanthogen disulfide, or a halogenated hydrocarbon such as iodoform, may be used. Such a chain transfer agent is used in a proper amount so that the number average molecular weight of the α,β-unsaturated carboxylate polymer obtained by the polymerization, will be at least 300,000.

In the present invention, the molecular weight of the α,β-unsaturated carboxylate polymer is defined to be at least 300,000 for the following reason. Namely, if the number average molecular weight of the polymer made of the unsaturated carboxylate is less than 300,000, deterioration in the tensile strength tends to be substantial, although the ozone resistance of the chloroprene polymer composition containing it may be improved. Further, differences are observed in the effects for improving the ozone resistance depending upon the conditions for evaluation of the ozone resistance. As the methods for evaluating the ozone resistance, JIS K6259 stipulates three types of evaluation methods, i.e. a static ozone-degradation test, a dynamic ozone-degradation test by extension method and a dynamic ozone-degradation test by cam rotation method. By the static ozone-degradation test, ozone degradation under a static strain (hereinafter referred to as the static ozone degradation) will be measured, and by the dynamic ozone-degradation test by extension method or the dynamic ozone-degradation test by cam rotation method, ozone degradation under a dynamic tensile strain (hereinafter referred to as the dynamic ozone degradation) will be measured. In the static ozone test under more severe conditions, the effects for improving the ozone resistance will be more excellent by using the α,β-unsaturated carboxylate polymer having a number average molecular weight of at least 300,000.

The temperature for polymerizing the α,β-unsaturated carboxylate is not particularly limited. However, the temperature is preferably selected within a range of from 0° to 90° C. If the temperature is lower than 0° C., freezing of water will be a problem, and if it exceeds 90° C., the evaporation of water will be a problem.

It is essential for the chloroprene polymer composition of the present invention to contain a chloroprene polymer and an α,β-unsaturated carboxylate polymer having a number average molecular weight of at least 300,000. The proportions of the respective components are not particularly limited. However, to obtain a composition having excellent ozone resistance without impairing various desired physical properties inherent to the chloroprene polymer, the content of the α,β-unsaturated carboxylate polymer having a number average molecular weight of at least 300,000 is usually within a range of from 30 to 60 wt %, preferably from 5 to 40 wt %, more preferably from 5 to 30 wt %.

To obtain the chloroprene polymer composition of the present invention comprising the chloroprene polymer and the α,β-unsaturated carboxylate polymer having a number average molecular weight of at least 300,000, these two polymers may be mixed. For this purpose, it is possible to employ, for example, a method of mixing an emulsion and a latex obtained by emulsion polymerization, a method of kneading the polymers in a solid state by means of an open roll, a kneader, a Banbury mixer or a single screw or twin screw extruder, or a method of blending solutions having the respective polymers dissolved in an organic solvent. Among them, it is preferred to employ a method of mixing an emulsion and a latex obtained by emulsion polymerization, since a uniform mixture can thereby readily be obtained.

Now, the present invention will be described in further detail with reference to Examples. However, it should be understood that the present invention is by no means restricted to such specific Examples. In the following description, "parts" and "%" mean "parts by weight" and "% by weight".

Preparation of chloroprene polymer latex (A1)

Into a 3 l glass flask, 100 parts of water, 5 parts of disproportionated rosinate as an emulsifier, 1.0 part of potassium hydroxide and 0.8 part of a sodium salt of a formaldehyde-naphthalene sulfonic acid condensation product as a dispersant, were charged and dissolved in a nitrogen stream. Then, a mixture of 100 parts of chloroprene and 0.1 part of n-dodecyl mercaptan was added thereto with stirring. The mixture was polymerized at a polymerization temperature of 40° C. by using potassium persulfate as a radical polymerization initiator, and when the conversion of the monomer reached 65%, tertbutylcatechol and thiodiphenylamine were added to terminate the polymerization. The unreacted monomer was removed under reduced pressure to obtain a chloroprene polymer latex (A1).

Preparation of chloroprene polymer latex (A2)

A chloroprene polymer latex (A2) was prepared in the same manner as for the chloroprene polymer latex (A1) except that instead of 100 parts of chloroprene, 95 parts of chloroprene and 5 parts of 2,3-dichloro-1,3-butadiene were used.

Preparation of α,β-unsaturated carboxylate polymer (B1)

Into a 3 l glass flask, 100 parts of water and 5 parts of sodium dodecyl benzene sulfonate as an emulsifier were charged and dissolved in a nitrogen stream. Then, 100 parts of n-butyl acrylate was added as an α,β-unsaturated carboxylate thereto with stirring. Polymerization was carried out at a polymerization temperature of 70° C. using potassium persulfate as a radical initiator until the monomer conversion reaches 98%, to obtain a n-butyl acrylate polymer emulsion (B1).

Preparation of α,β-unsaturated carboxylate polymers (B2 to B11)

Using α,β-unsaturated carboxylates and a molecular weight controlling agent as identified in Table 1, α,β-unsaturated carboxylate polymers (B2 to B11) were prepared in the same manner as for the α,β-unsaturated carboxylate polymer (B1).

The α,β-unsaturated carboxylate polymer emulsions thus obtained were freeze-dried to obtain polymers, which were subjected to gel permeation chromatography (hereinafter referred to simply as GPC, manufactured by Shimadzu Corporation) using polystyrene as the standard substance to measure the number average molecular weights. The results are shown in Table 1.

EXAMPLE 1

To 100 parts of the chloroprene polymer latex (A1), 5 parts (calculated as the solid content) of the n-butyl acrylate polymer emulsion (B1) was added with stirring. The mixture was thoroughly stirred and then subjected to freeze drying to obtain a chloroprene polymer composition.

EXAMPLES 2 TO 12 AND COMPARATIVE EXAMPLES 1 TO 4

Chloroprene polymer compositions were prepared in the same manner as in Example 1 by mixing an α,β-unsaturated carboxylate polymer in an amount (calculated as the solid content) as identified in Tables 2-1 to 2-2 and Table 3 to 100 parts of a chloroprene polymer.

The above chloroprene polymer compositions (raw rubbers) were formulated into vulcanizates of the formulation shown in Table 4, whereupon the physical property tests were carried out. The hardness, the tensile strength and the elongation were measured in accordance with JIS K 6301. The ozone resistance was evaluated by the dynamic ozone test (extension method) and the static ozone test in accordance with JIS K6259. The results are shown in Tables 5-1 to 5-2 and Table 6.

As described in the foregoing, the chloroprene polymer composition for the present invention is excellent in the ozone resistance and yet excellent mechanical properties inherent to the chloroprene polymer are maintained. Accordingly, it is particularly useful as a raw material for rubber boots such as constant velocity universal joint boots, rack & pinion boots and ball joint boots in the field of automobile industry. Further, it is useful also as an exterior rubber raw material for rubber hoses, for example, rubber hoses for automobiles such as a break hose, a power steering hose, a fuel hose, a radiator hose and a car air conditioner hose, or various high pressure rubber hoses. Still further, the chloroprene polymer composition of the present invention is useful also as a raw material for gaskets for buildings, such as an air tight gasket, a spacer gasket, a grazing gasket, a sealing gasket, a zipper gasket, a setting block and an expansion rubber.

TABLE 1

| | $\alpha,\beta$-Unsaturated carboxylates | Amount of n-dodecyl mercaptan (parts by weight) | Number average molecular weight (×10,000) |
|---|---|---|---|
| B-1 | n-Butyl acrylate | Nil | 70 |
| B-2 | Ethyl acrylate | Nil | 80 |
| B-3 | 2-Ethylhexyl acrylate | Nil | 50 |
| B-4 | n-Butyl methacrylate | Nil | 100 |
| B-5 | Ethyl acrylate/ 2-ethylhexyl acrylate (50/50) | Nil | 70 |
| B-6 | n-Butyl acylate | 0.05 | 30 |
| B-7 | n-Butyl acylate | 0.025 | 50 |
| B-8 | Ethyl acrylate | 0.015 | 50 |
| B-9 | n-Butyl acylate | 0.1 | 16 |
| B-10 | n-Butyl acylate | 0.2 | 10 |
| B-11 | Ethyl acrylate | 0.2 | 12 |

TABLE 2-1

| | Examples | | | | | |
|---|---|---|---|---|---|---|
| | 1 | 2 | 3 | 4 | 5 | 6 |
| Chloroprene polymer/parts | A1/100 | A1/100 | A1/100 | A1/100 | A1/100 | A1/100 |
| $\alpha,\beta$-Unsaturated carboxylate polymer/parts | B1/5 | B1/10 | B1/15 | B1/20 | B2/10 | B3/10 |

TABLE 2-2

| | Examples | | | | | |
|---|---|---|---|---|---|---|
| | 7 | 8 | 9 | 10 | 11 | 12 |
| Chloroprene polymer/parts | A1/100 | A1/100 | A1/100 | A1/100 | A1/100 | A2/100 |
| $\alpha,\beta$-Unsaturated carboxylate polymer/parts | B4/10 | B5/10 | B6/10 | B7/10 | B8/10 | B7/10 |

TABLE 3

| | Comparative Examples | | | |
|---|---|---|---|---|
| | 1 | 2 | 3 | 4 |
| Chloroprene polymer/parts | A1/100 | A1/100 | A1/100 | A1/100 |
| $\alpha,\beta$-Unsaturated carboxylate polymer/parts | B9/10 | B10/10 | B11/10 | Nil |

TABLE 4

| Raw rubber | 100 parts by weight |
|---|---|
| Antioxidant[1] | 1 |
| MgO | 4 |
| ZnO | 5 |
| Ethylenethiourea | 0.35 |
| SRF carbon[2] | 30 |

[1] Nocrak PA, manufactured by Ouchi Shinko Kagaku Corporation (Main component: N-phenyl-1-naphthylamine)
[2] Asahi #50, manufactured by Asahi Carbon Corporation

TABLE 5-1

| | Examples | | | | | |
|---|---|---|---|---|---|---|
| | 1 | 2 | 3 | 4 | 5 | 6 |
| (Vulcanizate) 141° C. × 40 min. | | | | | | |
| Hardness (JIS-A) | 56 | 55 | 54 | 50 | 56 | 55 |
| Tensile strength (kgf/cm²) | 200 | 195 | 190 | 175 | 180 | 150 |
| Elongation (%) | 555 | 550 | 540 | 505 | 500 | 480 |
| Ozone resistance (dynamic) 50 pphm × 0 to 20% Elong × 40° C. | | | | | | |
| 24 Hrs. | NC | NC | NC | NC | NC | NC |
| 48 Hrs. | NC | NC | NC | NC | NC | NC |
| 72 Hrs. | NC | NC | NC | NC | NC | NC |
| 96 Hrs. | NC | NC | NC | NC | NC | NC |
| 144 Hrs. | A-1 | NC | NC | NC | A-1 | NC |
| 192 Hrs. | A-2 | NC | NC | NC | A-2 | NC |
| 216 Hrs. | A-2 | NC | NC | NC | A-2 | NC |
| 240 Hrs. | A-2 | NC | NC | NC | A-2 | NC |
| Ozone resistance (static) 100 pphm × 20% Elong × 40° C. | | | | | | |
| 24 Hrs. | NC | NC | NC | NC | NC | NC |
| 48 Hrs. | NC | NC | NC | NC | NC | NC |
| 72 Hrs. | NC | NC | NC | NC | NC | NC |
| 96 Hrs. | NC | NC | NC | NC | NC | NC |
| 144 Hrs. | NC | NC | NC | NC | NC | NC |
| 192 Hrs. | NC | NC | NC | NC | NC | NC |
| 216 Hrs. | NC | NC | NC | NC | NC | NC |
| 240 Hrs. | NC | NC | NC | NC | NC | NC |

TABLE 5-2

| | Examples | | | | | |
|---|---|---|---|---|---|---|
| | 7 | 8 | 9 | 10 | 11 | 12 |
| (Vulcanizate) 141° C. × 40 min. | | | | | | |
| Hardness (JIS-A) | 55 | 50 | 58 | 57 | 57 | 57 |
| Tensile strength (kgf/cm²) | 200 | 175 | 182 | 180 | 180 | 175 |
| Elongation (%) | 460 | 490 | 495 | 490 | 481 | 480 |
| Ozone resistance (dynamic) 50 pphm × 0 to 20% Elong × 40° C. | | | | | | |
| 24 Hrs. | NC | NC | NC | NC | NC | NC |
| 48 Hrs. | NC | NC | NC | NC | NC | NC |
| 72 Hrs. | NC | NC | NC | NC | NC | NC |
| 96 Hrs. | NC | NC | NC | NC | NC | NC |
| 144 Hrs. | NC | NC | NC | NC | NC | NC |
| 192 Hrs. | NC | NC | NC | NC | NC | NC |
| 216 Hrs. | NC | NC | NC | NC | NC | NC |
| 240 Hrs. | NC | NC | NC | NC | NC | NC |
| Ozone resistance (static) 100 pphm × 20% Elong × 40° C. | | | | | | |
| 24 Hrs. | NC | NC | NC | NC | NC | NC |
| 48 Hrs. | NC | NC | NC | NC | NC | NC |
| 72 Hrs. | NC | NC | NC | NC | NC | NC |
| 96 Hrs. | NC | NC | NC | NC | NC | NC |
| 144 Hrs. | NC | NC | NC | NC | NC | NC |
| 192 Hrs. | NC | NC | NC | NC | NC | NC |
| 216 Hrs. | NC | NC | NC | NC | NC | NC |
| 240 Hrs. | NC | NC | NC | NC | NC | NC |

TABLE 6

| | Comparative Examples | | | |
|---|---|---|---|---|
| | 1 | 2 | 3 | 4 |
| (Vulcanizate) 141° C. × 40 min. | | | | |
| Hardness (JIS-A) | 57 | 57 | 57 | 60 |
| Tensile strength (kgf/cm²) | 164 | 163 | 164 | 195 |
| Elongation (%) | 465 | 465 | 431 | 492 |
| Ozone resistance (dynamic) 50 pphm × 0 to 20% Elong × 40° C. | | | | |
| 24 Hrs. | NC | NC | NC | A-2 |
| 48 Hrs. | NC | NC | NC | A-2 |
| 72 Hrs. | NC | NC | NC | A-2 |
| 96 Hrs. | NC | NC | NC | B-2 |
| 144 Hrs. | NC | NC | NC | B-2 |
| 192 Hrs. | NC | NC | NC | B-3 |
| 216 Hrs. | NC | NC | NC | B-3 |
| 240 Hrs. | NC | NC | NC | C-4 |
| Ozone resistance (static) 100 pphm × 20% Elong × 40° C. | | | | |
| 24 Hrs. | NC | NC | NC | A-2 |
| 48 Hrs. | NC | NC | NC | A-2 |
| 72 Hrs. | NC | NC | NC | A-2 |
| 96 Hrs. | NC | NC | NC | B-2 |
| 144 Hrs. | NC | A-1 | NC | B-2 |
| 192 Hrs. | NC | A-2 | A-2 | C-2 |
| 216 Hrs. | A-2 | A-2 | A-2 | C-3 |
| 240 Hrs. | A-3 | A-3 | A-3 | C-3 |

What is claimed is:

1. A process for producing a chloroprene polymer composition, which comprises mixing a chloroprene rubber latex and an $\alpha,\beta$-unsaturated carboxylate polymer emulsion, wherein said carboxylate polymer is a homopolymer of an $\alpha,\beta$-unsaturated carboxylate or a copolymer consisting essentially of two or more $\alpha,\beta$-unsaturated carboxylates, said $\alpha,\beta$-unsaturated carboxylate polymer having a number average molecular weight of at least 300,000.

2. The process according to claim 1, wherein said $\alpha,\beta$-unsaturated carboxylate polymer is a homopolymer of an $\alpha,\beta$-unsaturated carboxylate.

3. The process according to claim 1, wherein said, $\alpha\beta$-unsaturated carboxylate polymer is a copolymer consisting essentially of two or more $\alpha\beta$-unsaturated carboxylates.

4. The process according to claim 1, wherein said chloroprene polymer is a homopolymer of 2-chloro-1,3-butadiene or a copolymer of 2-chloro-1,3-butadiene with a monomer selected from the group consisting of 2,3-dichloro-1,3-butadiene, 1-chloro-1,3-butadiene, butadiene, isoprene, styrene, acrylonitrile, acrylic acid, ester of acrylic acid, methacrylic acid, ester of methacrylic acid and mixtures thereof.

5. The process according to claim 1, wherein said $\alpha,\beta$-unsaturated carboxylate polymer is a polymer of n-butyl acrylate.

* * * * *